Dec. 22, 1953 J. A. BAUER 2,663,240

CULTIVATOR ATTACHMENT FOR TRACTORS

Filed Nov. 26, 1951 4 Sheets-Sheet 1

INVENTOR

Joseph A. Bauer

BY

Kimmel & Crowell ATTORNEYS

Dec. 22, 1953 J. A. BAUER 2,663,240

CULTIVATOR ATTACHMENT FOR TRACTORS

Filed Nov. 26, 1951 4 Sheets-Sheet 2

INVENTOR
Joseph A. Bauer

BY
Kimmel & Crowell ATTORNEYS

Dec. 22, 1953 J. A. BAUER 2,663,240

CULTIVATOR ATTACHMENT FOR TRACTORS

Filed Nov. 26, 1951 4 Sheets-Sheet 3

INVENTOR

Joseph A. Bauer

BY

Kimmel & Crowell ATTORNEYS

Dec. 22, 1953 J. A. BAUER 2,663,240

CULTIVATOR ATTACHMENT FOR TRACTORS

Filed Nov. 26, 1951 4 Sheets-Sheet 4

INVENTOR
Joseph A. Bauer

BY
Kimmel & Crowell ATTORNEYS

Patented Dec. 22, 1953

2,663,240

UNITED STATES PATENT OFFICE 2,663,240

CULTIVATOR ATTACHMENT FOR TRACTORS

Joseph A. Bauer, Paul, Idaho

Application November 26, 1951, Serial No. 258,263

2 Claims. (Cl. 97—46.65)

Figure 1:
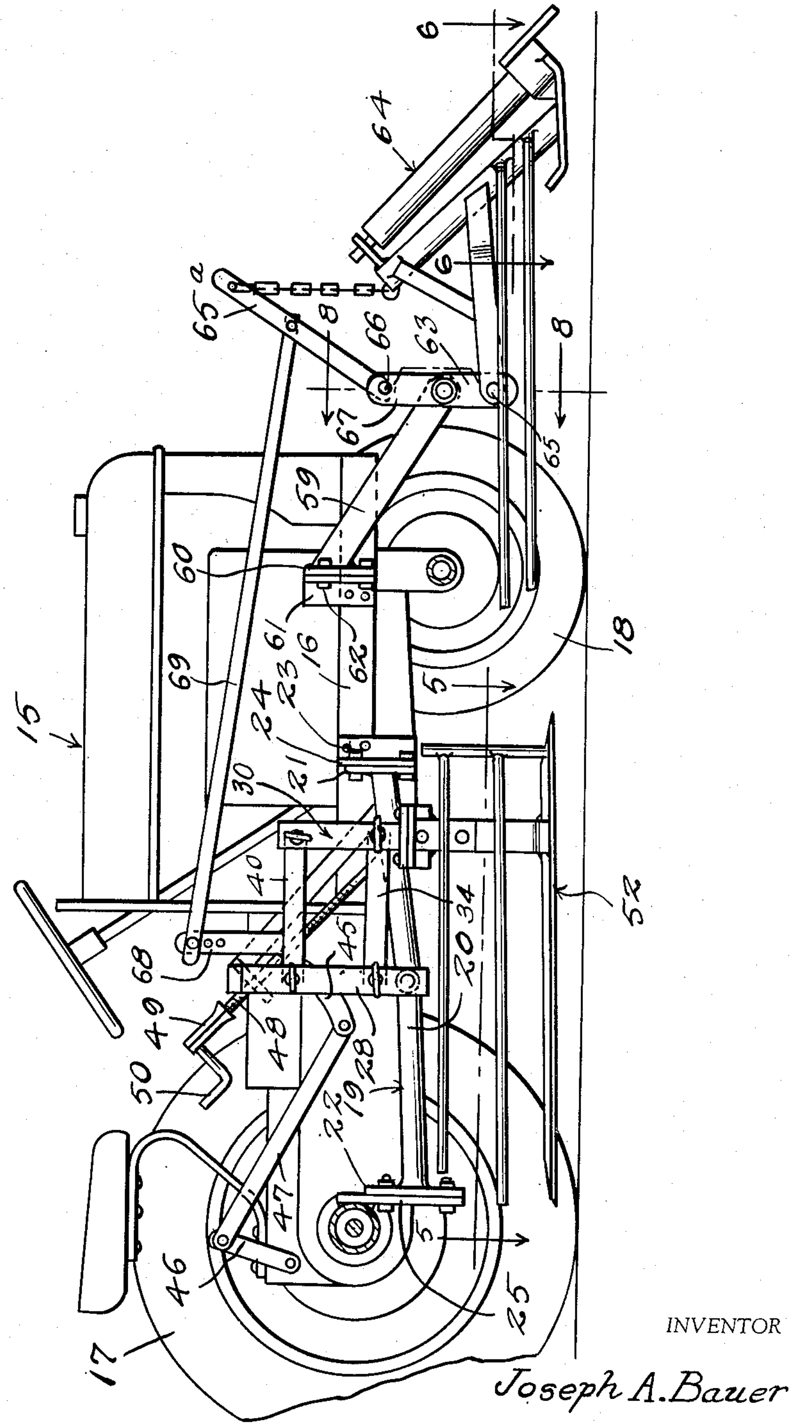

This invention relates to an implement carrier attachment for tractors.

An object of this invention is to provide an implement carrier attachment for a tractor which is designed for attachment to the power lift arms of the tractor whereby the depth of the working of the implement may be closely regulated while the tractor is moving.

Another object of this invention is to provide an implement carrier attachment which includes an implement supporting cradle formed of parallel bars for maintaining the implement in a predetermined operative or inoperative position.

A further object of this invention is to provide an implement carrier attachment which includes means for adjusting a leading implement with adjustment of the main earth working implement.

With the above and other objects in view, my invention consists in the arrangement, combination and details of construction disclosed in the drawings and specification, and then more particularly pointed out in the appended claims.

Figure 2:
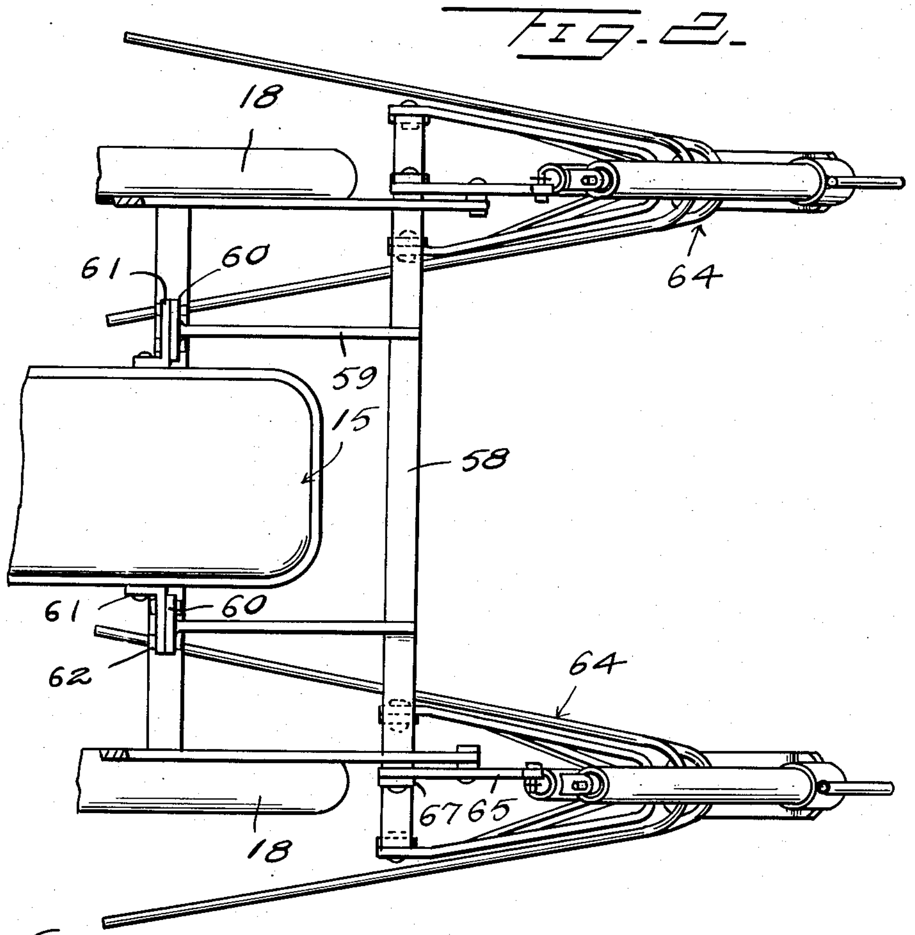
Figure 5:
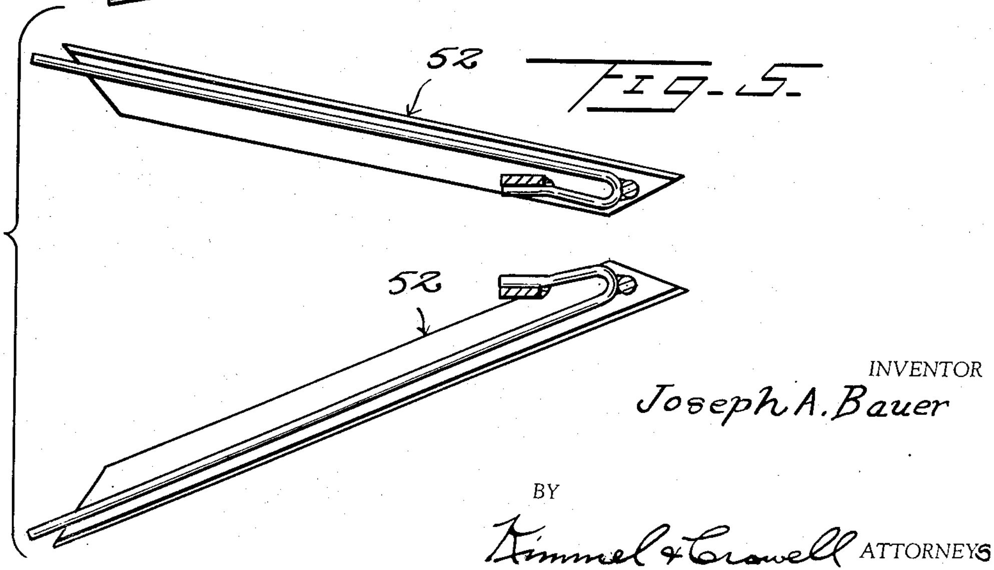
Figures 3, 4:
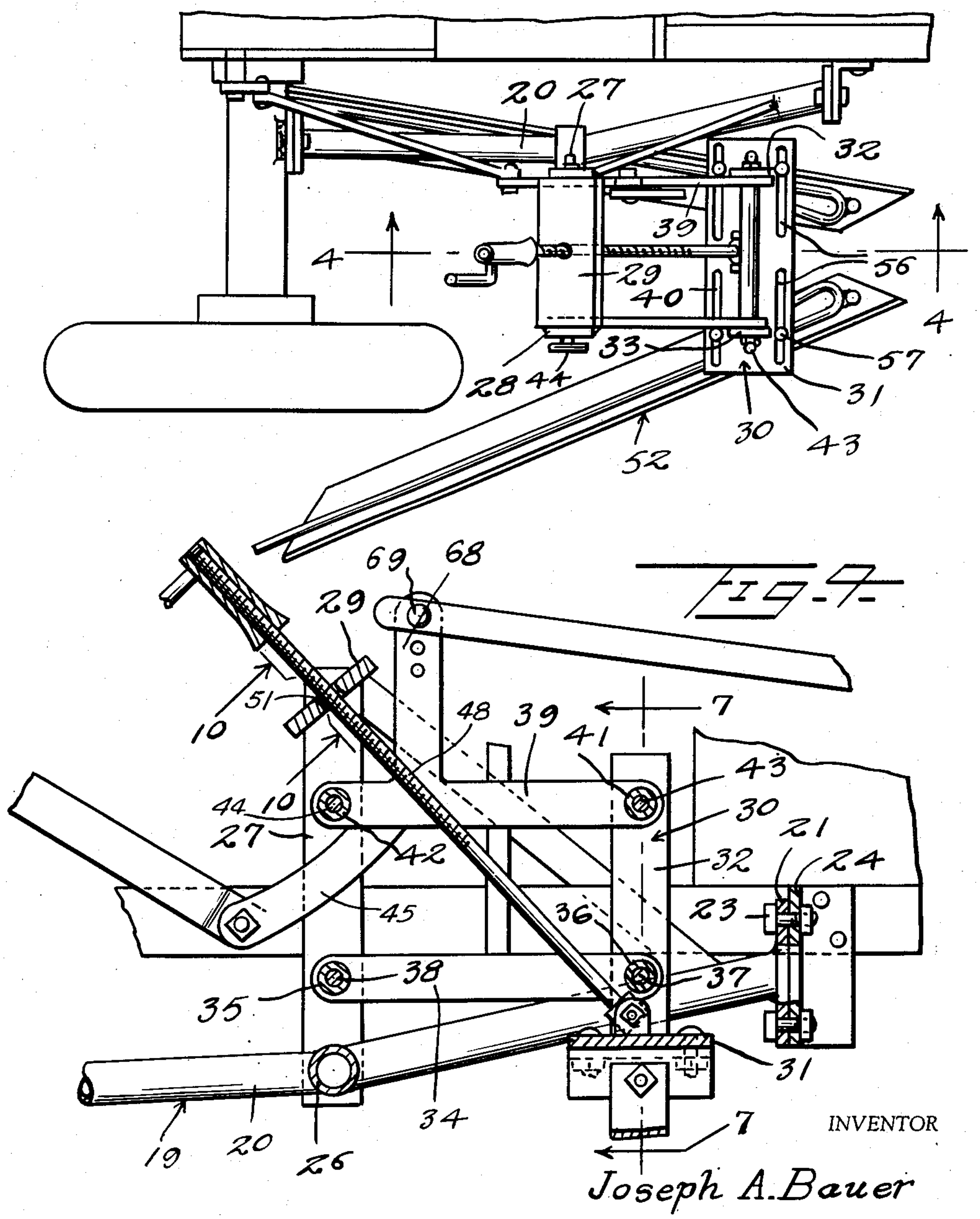
Figures 6, 7, 8, 9, 10:
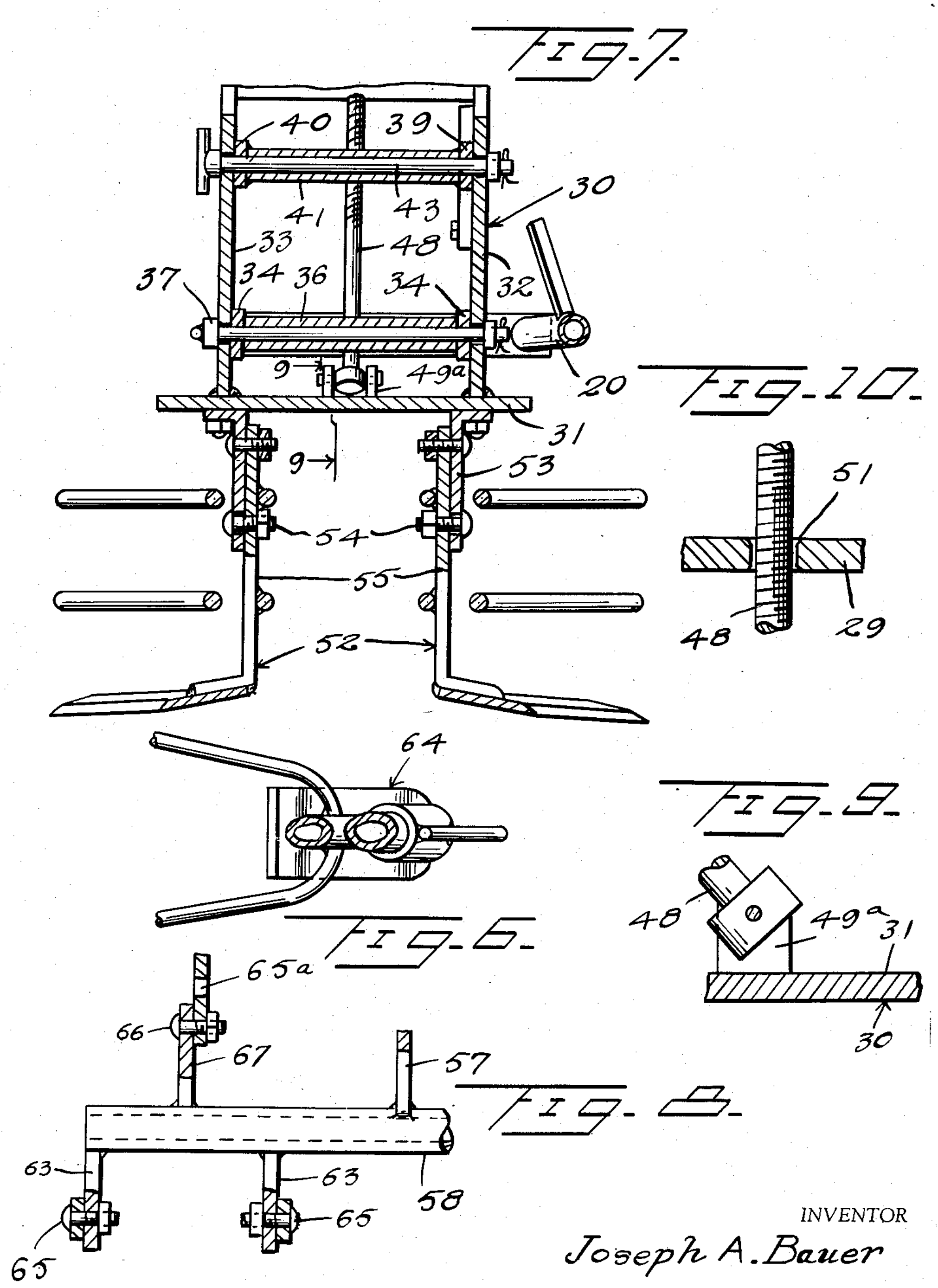

In the drawings:

Figure 1 is a detail side elevation of an implement carrier attachment constructed according to an embodiment of this invention, mounted on a tractor, Figure 2 is a plan view of the front or leading cultivator members, Figure 3 is a plan view of one of the pair of rear cultivator members, Figure 4 is a sectional view taken on the line 4—4 of Figure 3, Figure 5 is a sectional view taken on the line 5—5 of Figure 1, Figure 6 is a fragmentary sectional view taken on the line 6—6 of Figure 1, Figure 7 is a fragmentary sectional view taken on the line 7—7 of Figure 4, Figure 8 is a fragmentary sectional view taken on the line 8—8 of Figure 1, Figure 9 is a fragmentary sectional view taken on the line 9—9 of Figure 7, Figure 10 is a fragmentary sectional view taken on the line 10—10 of Figure 4.

Referring to the drawings, the numeral 15 designates generally a tractor of conventional construction which is formed with a frame 16, with rear driving wheels 17 and front steering wheels 18. A pair of frame members generally designated as 19 are secured one on each side of the tractor frame 16 and the frame or supporting members 19 include an elongated bar 20 having plates 21 and 22 at the forward and rear ends thereof which are secured by fastening devices 23 to laterally projecting brackets 24 and 25 carried by the tractor frame 16.

The bar 20, as shown in Figure 4, has secured thereto between the ends thereof an outwardly projecting tubular member 26, and a pair of upright inner and outer frame bars 27 and 28 respectively are secured to the tubular member 26. An upper connecting bar 29 is secured as by welding or the like, between the upper ends of the bars 27 and 28 and is disposed on an inclination to the vertical, as shown in Figure 4.

An adjustable cradle and implement carrier is disposed in a vertical position forwardly of the frame bars 27 and 28 and is indicated generally by the numeral 30. The carrier 30 is formed of a lower bar or plate 31 having secured to the upper side thereof upright bars 32 and 33, as shown more clearly in Figure 7. A lower pair of connecting links 34 are disposed between the frame bars 27 and 28 and the bars 32 and 33.

A tubular connecting member 35 is fixed between the rear ends of the links 34 and a similar tubular connecting link 36 is fixed between the forward ends of the links 34. A pivot member 37 extends through the upright bars 32 and 33 and the forward tubular member 36 for pivotally securing the carrier 30 to the links 34. A rear pivot member 38 is also extended through the fixed frame bars 27 and 28 and the rear tubular member 35 for pivotally connecting the rear ends of links 34 to the fixed frame members 27 and 28.

An upper pair of links 39 and 40 are disposed in parallel relation above the lower links 34 and the links 39 and 40 are fixed to the ends of tubular members 41 and 42. A forward pivot member 43 is extended through the upper end portions of the upright bars 32 and 33 and the tubular connecting member 41, and an upper rear pivot member 44 is extended through the upper end portions of bars 27 and 28 for pivotally connecting the links 39 and 40 to the frame members 27 and 28.

The cradle or implement carrier 30 is adjusted vertically to dispose the implement secured thereto in an operative or inoperative position by means of a rearwardly and downwardly extending arm 45 which is secured to inner link 39. Arm 45 is connected with the power or hydraulic lift arm 46 conventionally carried by the tractor 15 by means of a link 47. In order to provide a means whereby the lower and operative position of the carrier or cradle 30 may be closely regulated, I have provided a cradle limiting shaft 48 which is pivotally secured at its lower forward end between a pair of ears 49—*a* carried by a plate 31.

The shaft 48 extends upwardly and loosely through connecting plate 29 and a nut 49 is threaded on the upper rear end of shaft 48. Nut 49 has a crank handle 50 secured thereto so that the operator of the tractor may easily adjust nut 49 relative to the shaft 48. When the carrier or cradle 30 is in its lowered operative position, the forward or lower end of nut 49 will contact with plate 29. The opening 51 in plate 29, through which shaft 48 loosely engages, is of such diameter as to permit relative angular adjustment of shaft 48 relative to plate 29.

As herein disclosed, a pair of earth-working members or implements generally designated as 52 are secured to the plate 31 of carrier 30 and the earth-working members 52 are adapted to be adjusted relative to each other by means of a pair of L-shaped securing members 53 which are secured by fastening members 54 to the shank 55 of the earth-working member 52. Plate 31 is formed with pairs of elongated slots 56 through which fastening members 57 extend for securing the L-shaped members 53 to plate 31. A forward horizontally disposed supporting bar 58 is disposed at the front of the tractor 15, being fixedly secured to the tractor by means of a pair of rearwardly extending bars 59 which have plates 60 at their rear ends adapted to be secured to brackets 61 carried by the tractor by fastening means 62.

The supporting bar 58 has depending therefrom adjacent each end a pair of depending implement supporting arms 63. A forward implement, generally designated as 64, is pivotally secured to the arms 63 by pivot members 65. Each implement 64 is adapted to be lowered to an operative position or raised to an inoperative position by means of a rock lever 65*a* which is pivotally mounted on a pivot 66 carried by an upstanding arm 67, which is fixed to the horizontal bar 58. The forward or leading implement 64 is raised or lowered with the raising or lowering of the cradle or carrier 30 by means of an upstanding arm 68 which rises from the inner link 39.

An elongated bar or connecting link 69 is pivotally secured between the arm 68 and lever 65 so that downward and forward swinging of arm 68 with downward movement of carrier 30 to an operative position will cause implement 64 to be lowered to an operative position. Upward and rearward rocking of arm 68 by raising of cradle or carrier 30 to an inoperative position will also effect raising of implement 64 to an inoperative position.

In the use and operation of this attachment, the cradle 30 is secured to the tractor 15 by attaching the supporting bar 19 to the brackets 24 and 25. There will be a cradle and frame structure on each side of the tractor frame 16. Arm or lever 45 is connected to the implement lift lever 46 of the tractor by the link 47. When it is desired to lower implement 52 to a working or operative position, hydraulic lever 46 is rocked rearwardly thereby pulling links 39, 40 and 34 downwardly at their forward ends and lowering cradle 30 to the limit provided by the adjustment of nut 49 on limit shaft 48. The depth of the working of implement 52 can be regulated while the tractor is in operation by loosening nut 49 and additionally rocking lift lever 46 rearwardly and downwardly. With an attachment of this kind, the working depth of the implement can be very finely regulated so as to be effective for the particular kind of plants which are being cultivated.

It will, of course, be understood that the implements 52 and 64 are merely examples of earth-working implements with which the supporting cradle structure may be combined.

I do not mean to confine myself to the exact details of construction herein disclosed, but claim all variations falling within the purview of the appended claims.

What is claimed is:

1. A cultivator supporting attachment for a tractor adapted to be connected with the power lift, said attachment comprising a stationary frame including a pair of uprights, means mounting said frame on one side of the tractor, a carrier formed of a pair of uprights and a lower horizontal plate, upper and lower pairs of links, each link being pivotally connected at one end to an upright of said frame and at its other end to an aligned upright of said carrier, connections between the adjacent ends of the links of each pair for effecting simultaneous movement of all of said links, an earth working implement carried by said plate and movable by said links, a downwardly and rearwardly extending arm carried by the innermost of said upper pair of links, a connection between said arm and the power take-off for powered movement of all of said links to move said carrier, an upwardly extending arm carried by said innermost link of said upper pair, a stationary frame member mounted on said tractor forwardly of said first stationary frame, a downwardly and forwardly inclined supporting bar, a pair of implement supporting arms pivoted at their midpoint to said supporting bar, a second earth working implement pivotally connected to the lower end of said implement supporting arms and extending forwardly thereof, a forwardly extending rock lever connected to the upper ends of said implement supporting arms, an operating rod pivotally connected at one end to an intermediate point of said rock lever and pivotally connected at its other end to the upper extremity of said upwardly extending arm, and a chain connection between the forwardly extending end of said rock lever and the forwardly extending portion of said second earth working implement for tilting said forward end upwardly simultaneously with the lifting of said first earth working implement.

2. A cultivator supporting attachment for a tractor adapted to be connected with the power lift, said attachment comprising a stationary frame including a pair of uprights, means mounting said frame on one side of the tractor, a carrier formed of a pair of uprights and a lower horizontal plate, upper and lower pairs of links, each link being pivotally connected at one end to an upright of said frame and at its other end to an aligned upright of said carrier, connections between the adjacent ends of the links of each pair for effecting simultaneous movement of all of said links, an earth working implement carried by said plate and movable by said link, a downwardly and rearwardly extending arm carried by the innermost of said upper pair of links, a connection between said arm and the power take-off for powered movement of all of said links to move said carrier, an upwardly extending arm carried by said innermost link of said upper pair, a stationary frame member mounted on said tractor forwardly of said first stationary frame, a downwardly and forwardly inclined supporting bar, a pair of implement supporting arms pivoted at their mid-point to said supporting bar, a second earth working implement pivotally connected to the lower end of said implement supporting arms and extending forwardly thereof, a forwardly extending rock lever connected to the upper ends of said implement supporting arms, an operating rod pivotally connected at one end to an intermediate point of said rock lever and pivotally connected at its other end to the upper extremity of said upwardly extending arm, a chain connection between the forwardly extending end of said rock lever and the forwardly extending portion of said second earth working implement for tilting said forward end upwardly simultaneously with the lifting of said first earth working implement, and means comprising a rotatable threaded rod loosely supported by said first stationary frame and secured to said plate for variably limiting the movement of said frame and hence said earth working implements.

JOSEPH A. BAUER.

References Cited in the file of this patent

UNITED STATES PATENTS

| Number | Name | Date |
|---|---|---|
| 2,160,524 | Sutherland | May 30, 1939 |
| 2,179,793 | Lewison | Nov. 14, 1939 |
| 2,395,322 | Evans | Feb. 19, 1946 |
| 2,417,931 | Hipple | Mar. 25, 1947 |
| 2,505,280 | Ellinghuysen | Apr. 25, 1950 |
| 2,560,636 | Crenshaw | July 17, 1951 |
| 2,593,176 | Patterson | Apr. 15, 1952 |